US012682320B2

(12) United States Patent
Bianchini et al.

(10) Patent No.: US 12,682,320 B2
(45) Date of Patent: Jul. 14, 2026

(54) LATENT INTENT CLUSTERING IN HIGH LATENT SPACES

(71) Applicant: ADP, Inc., Roseland, NJ (US)

(72) Inventors: Leandro Bianchini, Porto Alegre (BR);
Renata Palazzo, Porto Alegre (BR);
Israel Oliveira, Porto Alegre (BR);
Allan Barcelos, Porto Alegre (BR);
Fernanda Tosca, Porto Alegre (BR)

(73) Assignee: ADP, Inc., Roseland, NJ (US)

( * ) Notice: Subject to any disclaimer, the term of this patent is extended or adjusted under 35 U.S.C. 154(b) by 0 days.

(21) Appl. No.: 18/752,234

(22) Filed: Jun. 24, 2024

(65) Prior Publication Data

US 2025/0068651 A1    Feb. 27, 2025

Related U.S. Application Data

(63) Continuation of application No. 18/125,316, filed on Mar. 23, 2023, now Pat. No. 12,019,656, which is a
(Continued)

(51) Int. Cl.

| | |
|---|---|
| *G06Q 10/10* | (2023.01) |
| *G06F 16/28* | (2019.01) |
| *G06N 5/04* | (2023.01) |
| *G06N 20/00* | (2019.01) |
| *G06V 30/418* | (2022.01) |
| *H04L 67/01* | (2022.01) |

(52) U.S. Cl.
CPC ........... *G06Q 10/10* (2013.01); *G06F 16/285* (2019.01); *G06N 5/04* (2013.01); *G06N 20/00* (2019.01); *G06V 30/418* (2022.01); *H04L 67/01* (2022.05)

(58) Field of Classification Search
CPC ..... G06Q 10/10; G06F 16/285; G06F 16/355; G06N 5/04; G06N 20/00; G06V 30/418;
(Continued)

(56) References Cited

U.S. PATENT DOCUMENTS

| | | | |
|---|---|---|---|
| 8,352,465 B1 * | 1/2013 | Jing | ...................... G06F 16/583 |
| | | | 707/723 |
| 9,092,458 B1 * | 7/2015 | Perona | ................... G06F 16/583 |

(Continued)

OTHER PUBLICATIONS

US Notice of Allowance issued in corresponding U.S. Appl. No. 18/125,316, dated Feb. 22, 2024 (8 pages).
(Continued)

*Primary Examiner* — Kris E Mackes
(74) *Attorney, Agent, or Firm* — Foley & Lardner LLP

(57) ABSTRACT

A method of latent intent clustering is provided. The method comprises encoding identified features in a number of electronic user reports in a database. A binary matrix is created, wherein each row of the binary matric represents a different report and each column represents a different available feature. A 1 is placed in each cell of the matrix that matches a feature present in a user report. Cosine similarities are calculated for the user reports, and a similarity matrix is created, wherein each row and column of the binary matrix represents a different report, and wherein the cosine similarities of the reports are placed in corresponding cells of the matrix. The reports are clustered according to the cosine similarities. Features common to reports in each cluster are identified, and an intent of each report cluster is labeled according to the common features.

20 Claims, 6 Drawing Sheets

Related U.S. Application Data continuation of application No. 17/021,292, filed on Sep. 15, 2020, now abandoned.

(58) Field of Classification Search
CPC ......... G06V 30/00; H04L 67/01; H04L 67/02; H04L 67/025; H04L 67/04; H04L 67/06; H04L 67/08; H04L 67/10; H04L 67/12; H04L 67/125; H04L 67/131; H04L 67/133; H04L 67/1396; H04L 9/40; H04N 1/00

See application file for complete search history.

(56) References Cited

U.S. PATENT DOCUMENTS

| | | | |
|---|---|---|---|
| 9,411,831 B2 * | 8/2016 | Baldwin | ................. G06F 16/51 |
| 9,672,288 B2 * | 6/2017 | Wu | ..................... G06F 16/9535 |
| 10,902,052 B2 * | 1/2021 | Bolin | ................... G06F 16/583 |
| 2012/0106367 A1 * | 5/2012 | Barkol | ................ G06F 16/9027 370/252 |
| 2013/0117046 A1 * | 5/2013 | Chaudhri | ............... G16H 70/00 705/3 |
| 2014/0129560 A1 * | 5/2014 | Grokop | ................. G06F 16/285 707/737 |
| 2016/0125500 A1 * | 5/2016 | Wang | ................. G06Q 30/0631 705/26.7 |
| 2022/0083568 A1 * | 3/2022 | Bianchini | .............. G06N 20/00 |

OTHER PUBLICATIONS

US Office Action issued in corresponding U.S. Appl. No. 17/021,292, dated Dec. 23, 2022 (16 pages).

US Office Action issued in corresponding U.S. Appl. No. 17/021,292, dated Jun. 23, 2022 (13 pages).

US Office Action issued in corresponding U.S. Appl. No. 18/125,316, dated Oct. 20, 2023 (19 pages).

* cited by examiner

300

My Totals | 5. Select Format | 6. Add Filters | 7. Run a Report es by    Can't find the field you are looking for? Go grab it!
Launch FieldGrabber ⊕

Selected Fields | Manage Files

Payroll Company Code (Position)

Home Department Code (Corporate Groups)

Sum Begin Count (Derived Fields)

Sum Hire Count (Derived Fields)

Sum Term Count (Derived Fields)

Sum End Count (Derived Fields)

Average Employees (Derived Fields)

Turnover Ratio (Derived Fields)

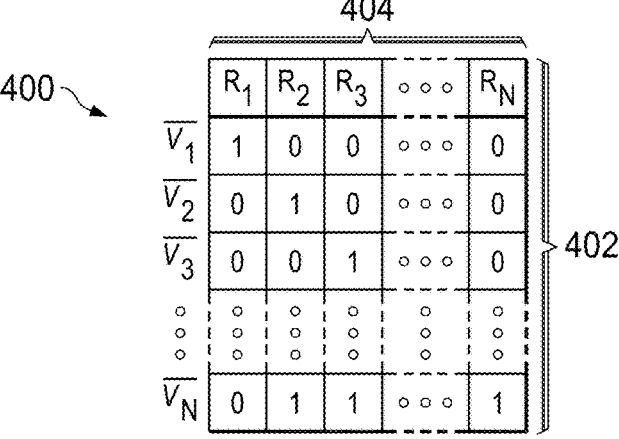

404

400

402

| | $R_1$ | $R_2$ | $R_3$ | ∘∘∘ | $R_N$ |
|---|---|---|---|---|---|
| $\overline{V}_1$ | 1 | 0 | 0 | ∘∘∘ | 0 |
| $\overline{V}_2$ | 0 | 1 | 0 | ∘∘∘ | 0 |
| $\overline{V}_3$ | 0 | 0 | 1 | ∘∘∘ | 0 |
| ∘∘∘ | ∘ | ∘ | ∘ | ∘ | ∘ |
| $\overline{V}_N$ | 0 | 1 | 1 | ∘∘∘ | 1 |

FIG. 4

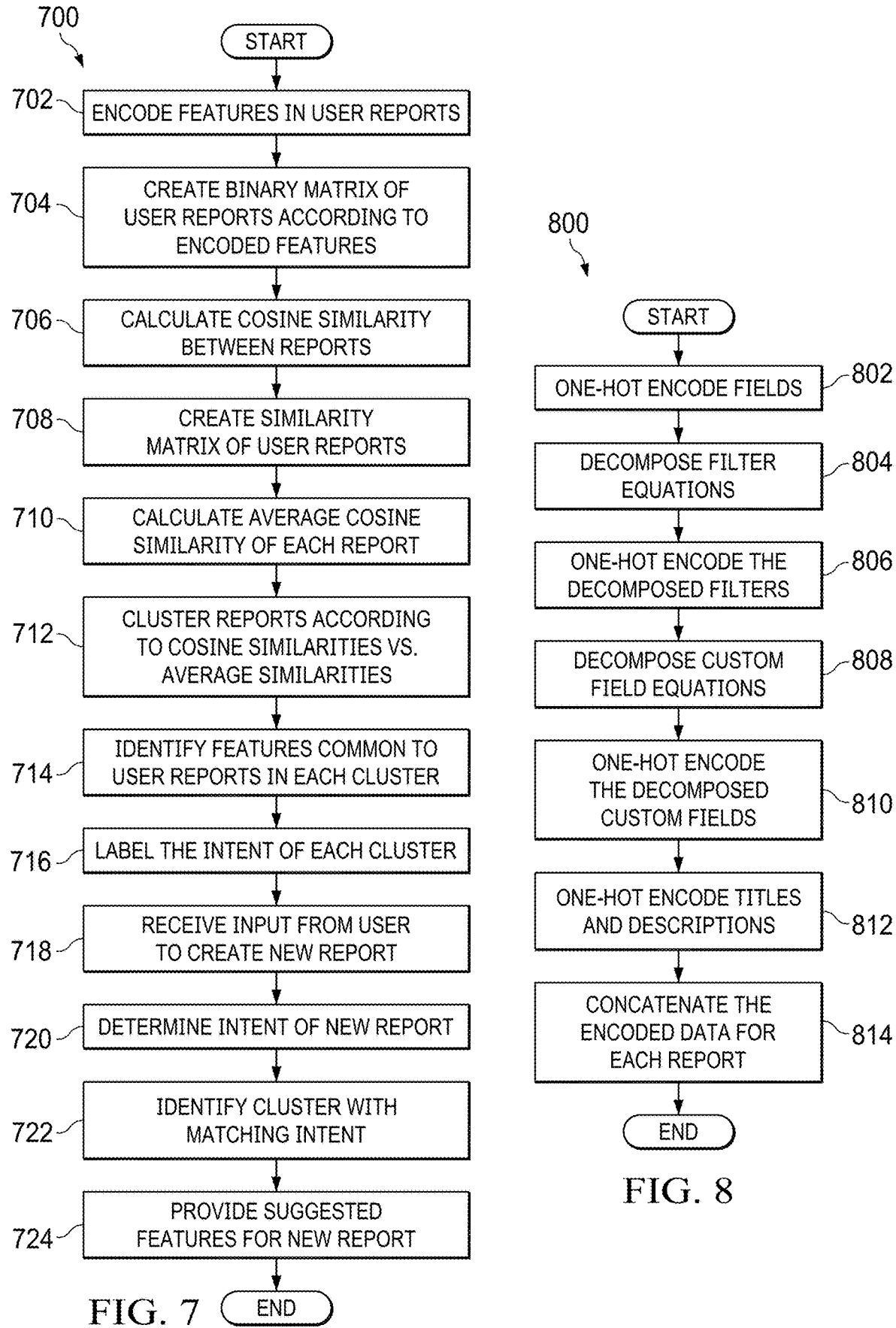

700

START

702 — ENCODE FEATURES IN USER REPORTS

704 — CREATE BINARY MATRIX OF USER REPORTS ACCORDING TO ENCODED FEATURES

706 — CALCULATE COSINE SIMILARITY BETWEEN REPORTS

708 — CREATE SIMILARITY MATRIX OF USER REPORTS

710 — CALCULATE AVERAGE COSINE SIMILARITY OF EACH REPORT

712 — CLUSTER REPORTS ACCORDING TO COSINE SIMILARITIES VS. AVERAGE SIMILARITIES

714 — IDENTIFY FEATURES COMMON TO USER REPORTS IN EACH CLUSTER

716 — LABEL THE INTENT OF EACH CLUSTER

718 — RECEIVE INPUT FROM USER TO CREATE NEW REPORT

720 — DETERMINE INTENT OF NEW REPORT

722 — IDENTIFY CLUSTER WITH MATCHING INTENT

724 — PROVIDE SUGGESTED FEATURES FOR NEW REPORT

END

START

ONE-HOT ENCODE FIELDS — 802

DECOMPOSE FILTER EQUATIONS — 804

ONE-HOT ENCODE THE DECOMPOSED FILTERS — 806

DECOMPOSE CUSTOM FIELD EQUATIONS — 808

ONE-HOT ENCODE THE DECOMPOSED CUSTOM FIELDS — 810

ONE-HOT ENCODE TITLES AND DESCRIPTIONS — 812

CONCATENATE THE ENCODED DATA FOR EACH REPORT — 814

END

FIG. 8

LATENT INTENT CLUSTERING IN HIGH LATENT SPACES

CROSS-REFERENCE TO RELATED APPLICATIONS

This application claims the benefit of priority under 35 U.S.C. § 120 as a continuation of U.S. patent application Ser. No. 18/125,316, filed Mar. 23, 2023, now U.S. Pat. No. 12,019,656, which claims the benefit of priority under 35 U.S.C. § 120 as a continuation of U.S. patent application Ser. No. 17/021,292, filed Sep. 15, 2020, now abandoned, each of which is hereby incorporated by reference herein in its entirety.

BACKGROUND INFORMATION

1. Field

The present disclosure relates generally to an improved computer system and, in particular, to a method of determining the intent behind user generated reports and providing suggested features for new reports based on features of past reports that match the intent of users in creating the new reports.

2. Background

Organizations typically produce routine reports documenting activities related to the organizations. Increasingly these reports are electronic in form and are created with specialize applications.

Every report created by reporting applications has a purpose and objective resulting from the intent of the report owner/creator. However, a wide set of potential features to include in a report can overwhelm users, resulting in confusion regarding which fields, filters, and derived or calculated fields should be included. Working through these possibilities to arrive at the optimal combination of features for a new report can potentially be time consuming and inefficient.

SUMMARY

An illustrative embodiment provides a computer-implemented method of latent intent clustering. The method comprises encoding identified features in a number of electronic user reports in a database. A binary matrix is created, wherein each row of the binary matric represents a different report and each column represents a different available feature. A 1 is placed in each cell of the matrix that matches a feature present in a user report. Cosine similarities are calculated for the user reports, and a similarity matrix is created, wherein each row and column of the binary matrix represents a different report, and wherein the cosine similarities of the reports are placed in corresponding cells of the matrix. The reports are clustered according to the cosine similarities. Features common to reports in each cluster are identified, and an intent of each report cluster is labeled according to the common features.

Another illustrative embodiment provides a system for latent clustering. The system comprises a storage device configured to store program instructions and one or more processors operably connected to the storage device and configured to execute the program instructions to cause the system to: encode identified features in a number of electronic user reports in a database; create a binary matrix, wherein each row of the binary matric represents a different user report and each column of the binary matrix represents a different available feature, and wherein a 1 is placed in each cell of the binary matrix that matches a feature present in a user report; calculate cosine similarities of user reports represented in the binary matrix; create a similarity matrix, wherein each row and column of the binary matrix represents a different user report, and wherein the cosine similarities of the user reports are placed in corresponding cells of the similarity matrix; cluster the user reports in the similarity matrix into report clusters according to the cosine similarities; identify features common to user reports in each report cluster; and label an intent of each report cluster according to the common features.

Another illustrative embodiment provides a computer program product for latent intent clustering. The computer program product comprises a computer-readable storage medium having program instructions embodied thereon to perform the steps of: encoding identified features in a number of electronic user reports in a database; creating a binary matrix, wherein each row of the binary matric represents a different user report and each column of the binary matrix represents a different available feature, and wherein a 1 is placed in each cell of the binary matrix that matches a feature present in a user report; calculating cosine similarities of user reports represented in the binary matrix; creating a similarity matrix, wherein each row and column of the binary matrix represents a different user report, and wherein the cosine similarities of the user reports are placed in corresponding cells of the similarity matrix; clustering the user reports in the similarity matrix into report clusters according to the cosine similarities; identifying features common to user reports in each report cluster; and labeling an intent of each report cluster according to the common features.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 3 illustrates the encoding of reports features in accordance with an illustrative embodiment;

FIG. 4 illustrates a binary matrix of encoded user reports in accordance with an illustrative embodiment;

FIG. 7 depicts a flowchart illustrating a process of latent intent clustering in accordance with an illustrative embodiment;

FIG. 8 depicts a flowchart illustrating a process of feature encoding in accordance with an illustrative embodiment.

DETAILED DESCRIPTION

The illustrative embodiments recognize and take into account one or more different considerations. The illustrative embodiments recognize and take into account that a wide set of potential features to include in a report can overwhelm users, resulting in confusion regarding which fields, filters, and derived or calculated fields should be included. The illustrative embodiments recognize and take into account that working through these possibilities to arrive at the optimal combination of features for a new report can potentially be time consuming and inefficient.

The illustrative embodiments also recognize and take into account that even when users do not know which features should be included in a report, the users do know their purpose and intent in creating the report. However, current applications that perform massive logging of user actions during creation of reports do not recognize the context or objective of those user actions.

The illustrative embodiments apply machines learning to determine the intent of a user in creating a new report. By determining connectivity between features in reports, the illustrative embodiments map patterns of features to intent that can be used to suggest constituent features to a user creating a new report based on the intent of that new report.

Figure 1:
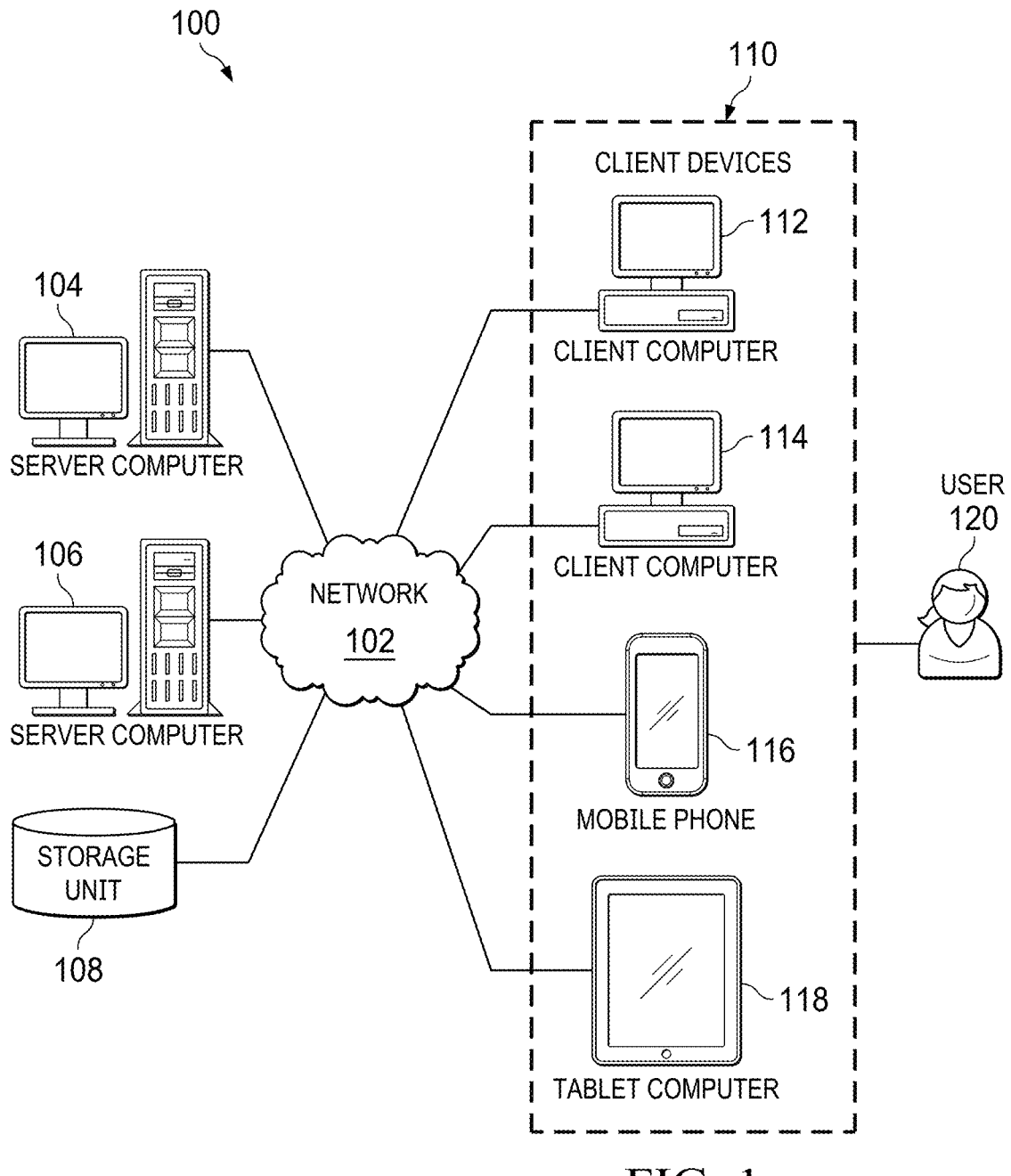
FIG. 1 depicts a block diagram of an information environment in accordance with an illustrative embodiment.

With reference now to the figure and in particular with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112 and client computer 114. Further, client devices 110 can also include other types of client devices such mobile phone 116 and tablet computer 118. Client devices 110 can be, for example, computers, workstations, or network computers. In the depicted example, server computer 104 provides information, such as boot files, operating system images, and applications to client devices 110. In this illustrative example, server computer 104, server computer 106, storage unit 108, and client devices 110 are network devices that connect to network 102 in which network 102 is the communications media for these network devices.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). Network 102 may be comprised of the Internet-of-Things (IoT). FIG. 1 is intended as an example, and not as an architectural limitation for the different illustrative embodiments.

Figure 2:
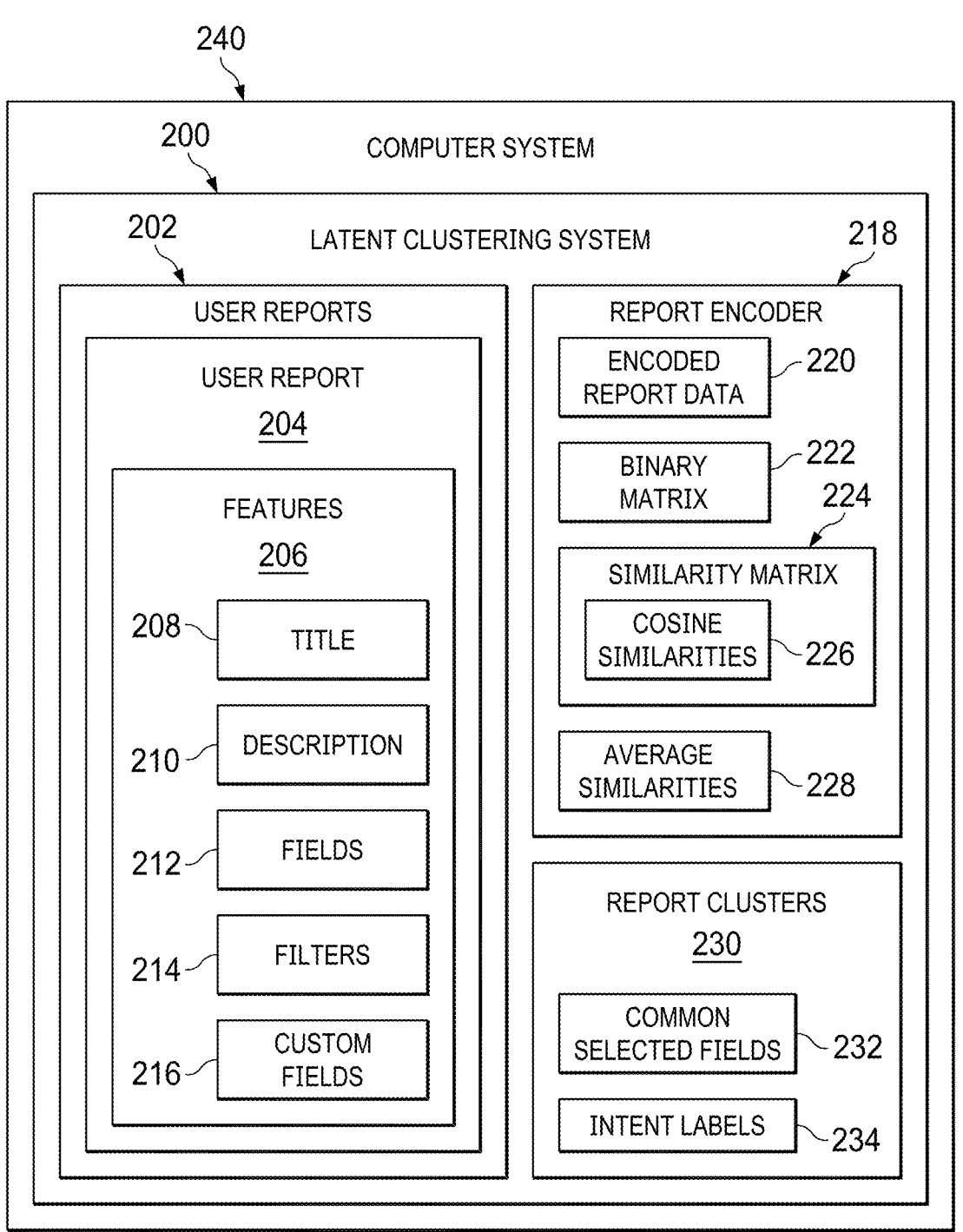
FIG. 2 depicts a block diagram of a latent intent clustering system in accordance with an illustrative embodiment.

FIG. 2 depicts a block diagram of a latent clustering system in accordance with an illustrative embodiment. Latent clustering system 200 might be implemented in a computing environment such as network data processing system 100 and utilized by computing devices such as server computer 104 and 106 and client devices 110.

As depicted latent clustering system 200 can be located in computer system 240. Computer system 240 is a physical hardware system and includes one or more data processing systems. When more than one data processing system is present in computer system 240, those data processing systems are in communication with each other using a communications medium. The communications medium can be a network. The data processing systems can be selected from at least one of a computer, a server computer, a tablet computer, or some other suitable data processing system.

The processes for latent clustering system 200 can run on a number of processors in computer system 240. The number of processors is one or more processors. As used herein a processor is comprised of hardware circuits such as those on an integrated circuit that respond and process instructions and program code that operate a computer. When a number of processors execute instructions for a process, the number of processors is one or more processors can be on the same computer or on different computers in computer system 240. In other words, the process can be distributed between processors on the same or different computers in computer system 240. Further, the number of processors can be of the same type or different type of processors. For example, a number of processors can be selected from at least one of a single core processor, a dual-core processor, a multi-processor core, a general-purpose central processing unit (CPU), a graphics processing unit (GPU), a digital signal processor (DSP), or some other type or processor.

Latent clustering system 200 collects a number of electronic user reports 202 previously created by users. These reports might be stored in a database. Each user report 204 comprises a number of features 206. The features 206 might include a title 208, description 210, reports fields 212, filters 214, and custom (derived or coded) fields 216.

The reports 202 are fed into a report encoder 218 that encodes the reports to generate encoded report data 220. From the encoded report data 220, report encoder 218 creates a binary matrix 222 in which each row represents a different user report and each column represents a different type of available information that might be included in a report.

Cosine similarity is applied on each row and column of the binary matrix 222 to obtain similarity matrix 224. Each row and column of similarity matrix 224 represents a different user report. The cells at the intersections of the rows and columns in similarity matrix 224 store the respective cosine similarities 226 between the corresponding reports.

The similarity matrix 224 is used to obtain average similarities 228 of reports 202, which are the average (mean) similarity that each report has to every other report.

Based on the similarity matrix 224 and the average similarities 228, report clusters 230 are obtained using each report's average similarity and the corresponding similarity between reports. For a given pair of reports in similarity matrix 224, if the cosine similarity score 226 between them is higher than the average similarities 228 of both reports, the report pair in question can be grouped into a cluster.

Latent clustering system 200 can identify common selected fields 232 shared by reports within a given cluster. Intent labels 234 can be assigned to the report clusters 230 based on the common shared fields 232.

Latent intent clustering system 200 can be implemented in software, hardware, firmware, or a combination thereof. When software is used, the operations performed by latent intent clustering system 200 can be implemented in program code configured to run on hardware, such as a processor unit. When firmware is used, the operations performed by latent intent clustering system 200 can be implemented in program code and data and stored in persistent memory to run on a processor unit. When hardware is employed, the hardware may include circuits that operate to perform the operations in latent intent clustering system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components can be located in a computer system, which is a physical hardware system and includes one or more data processing systems. When more than one data processing system is present in the computer system, those data processing systems are in communication with each other using a communications medium. The communications medium can be a network. The data processing systems can be selected from at least one of a computer, a server computer, a tablet computer, or some other suitable data processing system.

FIG. 3 illustrates the encoding of reports features in accordance with an illustrative embodiment. In the example shown, a user interface (UI) 300 displays a number of selected fields 302 that are included in a user report. These selected fields can be encoded into a binary vector 304 representing the report, along with other features of the report. Binary vector 304 is an example of encoded report data 220 in FIG. 2.

FIG. 4 illustrates a binary matrix of encoded user reports in accordance with an illustrative embodiment. After encoding, each report is represented by a vector $\bar{v}$. Binary matrix 400 is an example of binary matrix 222 in FIG. 2.

Each row 402 in similarity matrix 400 represents a different user report. Each column $R_1$-$R_n$ 404 represents a different available information type that might be selected by a user for inclusion in a report. For each report, a 1 is placed in each respective column of fields that are selected for that report. The illustrative embodiments determine which selected fields the reports have in common and how those selected fields relate to the user intent behind the reports.

Figure 5:
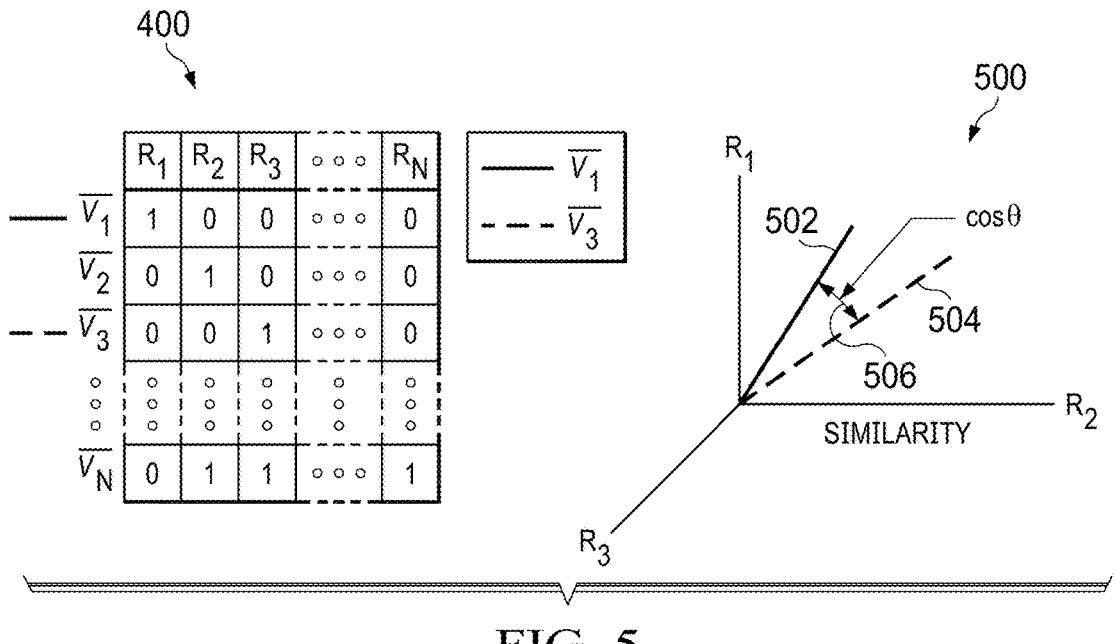
FIG. 5 illustrates determining similarities between report in accordance with an illustrative embodiment.

FIG. 5 illustrates determining similarities between reports in accordance with an illustrative embodiment. The vectors $\bar{v}_1$-$\bar{v}_n$ representing the reports in matrix 400 are projected into a N-dimensional space 500, wherein N is the number of report information types R available for selection. For simplicity and ease of illustration, a three-dimensional space is depicted in FIG. 5, but it should be understood that a greater number of dimensions can be and typically would be used.

In the example shown in FIG. 5, vector $\bar{v}_1$ 502 and vector $\bar{v}_n$ 504 are projected in space 500. The similarity between the vectors 502, 504 is determined according to the cosine 506 of the angle between the vectors in space 500. The more selected fields any two vectors have in common the smaller the angle between them and the higher the cosine. The cosine of 0° is 1. Conversely, the cosine of 90° is 0. Reports that are most similar will be closer together than others.

Figure 6:
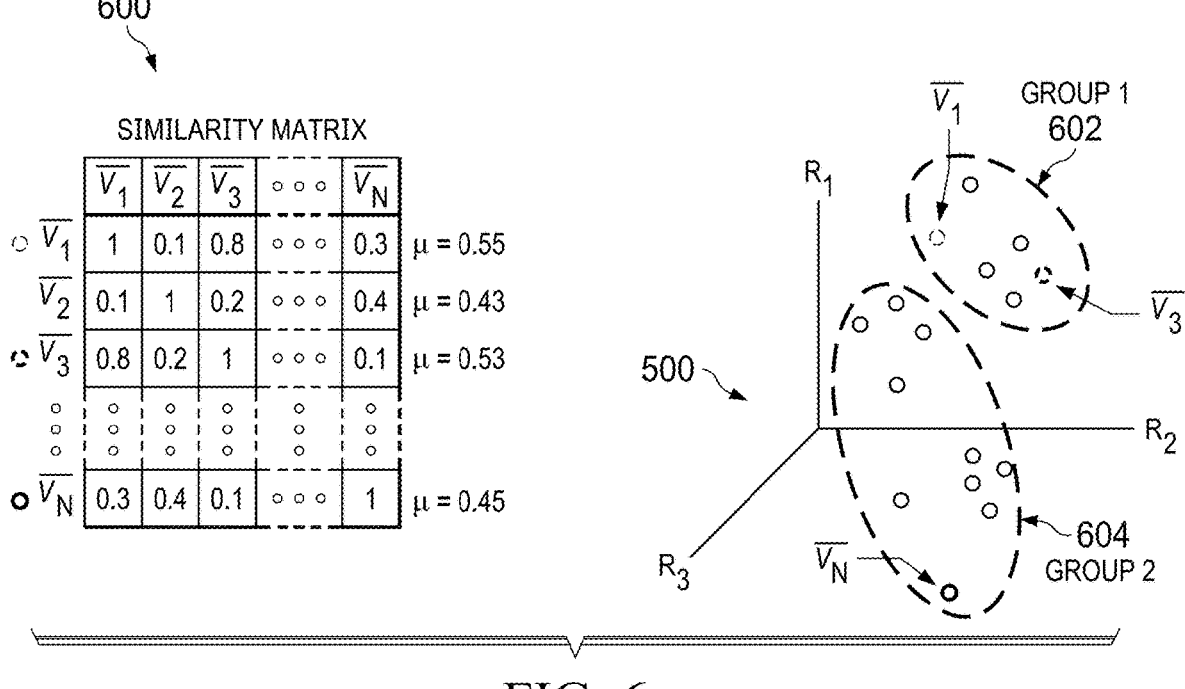
FIG. 6 illustrates clustering of report vectors in accordance with an illustrative embodiment.

FIG. 6 illustrates clustering of report vectors in accordance with an illustrative embodiment. After determining the cosine similarity of the reports in matrix 400, similarity matrix 600 is created. Similarity matrix 600 is an example of similarity matrix 224 in FIG. 2.

Each row and column of similarity matrix 600 represents a different one of report vectors $\bar{v}_1$ through $\bar{v}_n$, allowing the cross-reference of each report against every other report. Each cell at the intersection of a row and column contains the cosine similarity score between the respective report vectors in that row and column. Obviously, the cosine similarity of a vector cross-referenced against itself is 1. An average similarity score, $\mu$, can be calculated for each report vector, representing that report's overall degree of similarity to the other reports in the database. In the example shown in FIG. 6, $\bar{v}_1$ has an average similarity score of 0.55, $\bar{v}_2$ has an average similarity score of 0.43, $\bar{v}_3$ has an average similarity score of 0.53, and $\bar{v}_n$ has an average similarity score of 0.45.

Comparing the cosine similarity between two report vectors with their respective average similarities determines how similar or dissimilar they are to each other relative to the other reports. From this comparison, the reports can be clustered (grouped) according to the degree of their similarity. In the illustrated example, the report vectors are clustered into Group 1 602 and Group 2 604. Report vectors that have cosine similarities above their respective average similarities are clustered together. For example, report vectors $\bar{v}_1$ and $\bar{v}_3$ have a cosine similarity score of 0.8, which is higher than both of their respective similarity averages of 0.55 and 0.53. Therefore, they are clustered together in Group 1 602. In contrast, the cosine similarity of $\bar{v}_1$ and $\bar{v}_n$ is 0.3, which is below both of their respective averages of 0.55 and 0.45. Similarly, the cosine similarity of $\bar{v}_3$ and $\bar{v}_n$ is 0.1, well below their respective averages of 0.53 and 0.45. Therefore, $\overline{v_2}$ is not included in Group 1 602 with $\overline{v_1}$ and $\overline{v_3}$ but rather Group 2 604. This process is repeated for all report vectors in similarity matrix 600.

The selected application fields that reports in a cluster share in common reflect the intent behind the reports, which can be used to label the intent of the cluster.

FIG. 7 depicts a flowchart illustrating a process of latent intent clustering in accordance with an illustrative embodiment. The process in FIG. 7 can be implemented in hardware, software, or both. When implemented in software, the process can take the form of program code that is run by one of more processors located in one or more hardware devices in one or more computer systems. Process 700 might be implemented in latent clustering system 200 shown in FIG. 2.

Process 700 begins by encoding identified features in a number of electronic user reports in a database to create encoded data (step 702). Features might include title, description, fields, files, filters, and custom (derived or coded) fields.

A binary matrix is created, wherein each row of the binary matric represents a different user report and each column of the binary matrix represents a different available feature (step 704). There might be N features that are available for users to select and include in a report. The encoded data for each user report is mapped to the binary matrix, wherein a 1 is placed in each cell of the binary matrix that matches a feature present in a user report.

Cosine similarities are calculated between the reports represented in the binary matrix (step 706). A similarity matrix is then created, wherein each row and column of the binary matrix represents a different user report, and wherein the cosine similarities of the user reports are placed in corresponding cells of the similarity matrix (step 708).

An average cosine similarity is calculated for each user report represented in the similarity matrix (step 710). The user reports in the similarity matrix are clustered into report clusters according to the cosine similarities relative to their (step 712). User reports that have cosine similarities greater than their respective average cosine similarities are clustered together.

Process 700 identifies features common to user reports in each report cluster (step 714). For example, the features in common might be application fields.

An intent of each report cluster is then labeled according to the common features (step 716). The report clusters group might have just a few unique fields in common, which are related. The ID of the unique fields can be used to compose the cluster name.

If a user wishes to create a new report, the system receives input from the user to create a new user report (step 718). The input might include features such as the title, description, selected fields, report filters, and custom fields of the new user report. Based on the features of the new user report, the system determines the intent of the new user report (step 720).

The system then identifies a report cluster labeled with an intent that matches the intent of the new user report (step 722). The user is then provided with suggested features for the new user report according to features in the identified matching report cluster (step 724). Process 700 then ends.

FIG. 8 depicts a flowchart illustrating a process of feature encoding in accordance with an illustrative embodiment. The process in FIG. 8 can be implemented in hardware, software, or both. When implemented in software, the process can take the form of program code that is run by one of more processors located in one or more hardware devices in one or more computer systems. Process 800 is a more detailed example of step 702 shown in FIG. 7.

Process 800 begins by one-hot encoding the fields in the user report (step 802). One-hot encoding converts categorical (nominal) variables that contain label values rather than numeric values into integer data than can be applied to machine learning.

Process 800 decomposes equations of filters in the user report to produce decomposed filters (step 804). The decomposed filters are then one-hot encoded (step 806).

Process 800 also decomposes equations of custom fields in the user report to produce decomposed custom fields (step 808) and one-hot encodes the decomposed custom fields (step 810).

The title and description of the report are one-hot encoded (step 812). The encoded data for each report is then concatenated (step 814). Process 800 then ends.

Figure 9:
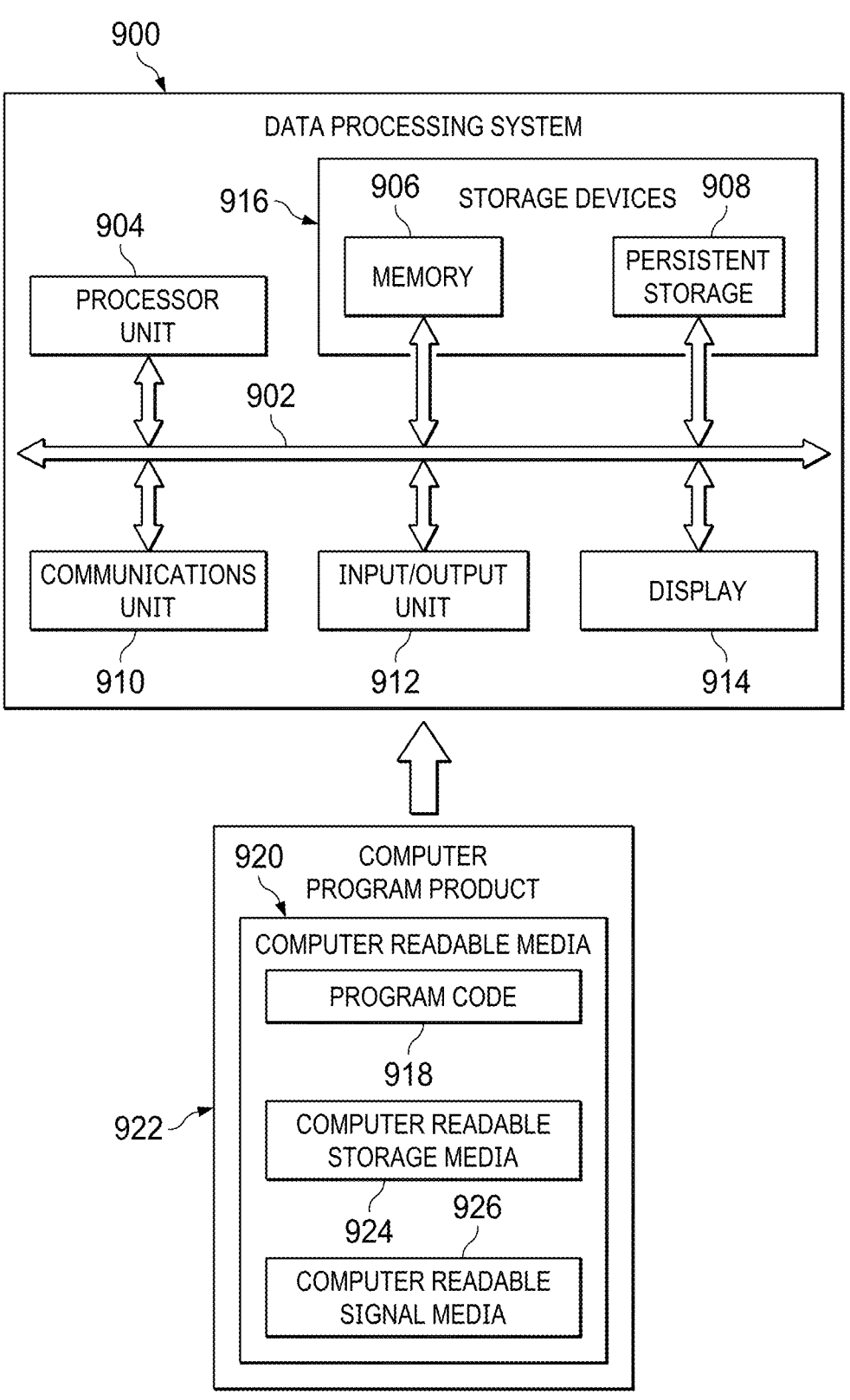
FIG. 9 is a block diagram of a data processing system in accordance with an illustrative embodiment.

Turning now to FIG. 9, an illustration of a block diagram of a data processing system is depicted in accordance with an illustrative embodiment. Data processing system 900 may be used to implement one or more of server computers 104, 106 and client devices 110 in FIG. 1. In this illustrative example, data processing system 900 includes communications framework 902, which provides communications between processor unit 904, memory 906, persistent storage 908, communications unit 910, input/output unit 912, and display 914. In this example, communications framework 902 may take the form of a bus system.

Processor unit 904 serves to execute instructions for software that may be loaded into memory 906. Processor unit 904 may be a number of processors, a multi-processor core, or some other type of processor, depending on the particular implementation. In an embodiment, processor unit 904 comprises one or more conventional general-purpose central processing units (CPUs). In an alternate embodiment, processor unit 904 comprises one or more graphical processing units (GPUs).

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 916, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908. Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least one of a keyboard, a mouse, or some other suitable input device.

Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer-usable program code, or computer-readable program code that may be read and executed by a processor in processor unit 904. The program code in the different embodiments may be embodied on different physical or computer-readable storage media, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these illustrative examples. In one example, computer-readable media 920 may be computer-readable storage media 924 or computer-readable signal media 926.

In these illustrative examples, computer-readable storage media 924 is a physical or tangible storage device used to store program code 918 rather than a medium that propagates or transmits program code 918. Alternatively, program code 918 may be transferred to data processing system 900 using computer-readable signal media 926.

Computer-readable signal media 926 may be, for example, a propagated data signal containing program code 918. For example, computer-readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

Further, as used herein, "computer-readable media 920" can be singular or plural. For example, program code 918 can be located in computer-readable media 920 in the form of a single storage device or system. In another example, program code 918 can be located in computer-readable media 920 that is distributed in multiple data processing systems. In other words, some instructions in program code 918 can be located in one data processing system while other instructions in program code 918 can be located in one data processing system. For example, a portion of program code 918 can be located in computer-readable media 920 in a server computer while another portion of program code 918 can be located in computer-readable media 920 located in a set of client computers.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system, comprising:

one or more processors, coupled with memory, to:

encode a plurality of features selected from a plurality of digital records to form a plurality of binary vectors, wherein each of the plurality of binary vectors is associated with a respective digital record of the plurality of digital records;

construct a first matrix using the plurality of binary vectors, wherein each row of the first matrix represents a digital record and each column of the first matrix represents at least one of the plurality of features;

apply a vector-based function to the first matrix to compute a metric indicative of an association between each pair of binary vectors;

construct a second matrix based on application of the vector-based function, wherein each entry of the second matrix comprises a respective metric associated with a corresponding pair of binary vectors;

compute, for each binary vector, a corresponding average metric based on entries in the second matrix that include each binary vector;

determine that the metric associated with a respective entry in the second matrix exceeds the corresponding average metric for one or both of the binary vectors associated with the respective entry;

group, responsive to the determination that the metric exceeds the corresponding average metric, the plurality of digital records into a plurality of clusters;

determine a label for each cluster of the plurality of clusters based on one or more features common to digital records in a respective cluster;

responsive to receiving input corresponding to a new digital record, identify at least one cluster from the plurality of clusters having a label that corresponds to one or more features of the new digital record;

generate one or more suggested features for the new digital record based on the at least one cluster; and transmit, to a computing device, data to cause the computing device to present, via an output device coupled with the computing device, the one or more suggested features for the new digital record.

2. The system of claim 1, wherein the vector-based function comprises a cosine similarity function, wherein the metric indicative of the association between each pair of binary vectors comprises a cosine similarity value, and wherein to compute each corresponding average metric, the one or more processors further:

access entries of the second matrix that correspond to pairs that include each binary vector;

compute an average cosine similarity value for each binary vector based on the cosine similarity value of each accessed entry; and store the average cosine similarity value as the corresponding average metric for each binary vector.

3. The system of claim 1, wherein to encode the plurality of features, the one or more processors further:

extract, for each digital record of the plurality of digital records, a title, a description, one or more filter expressions, and one or more custom fields;

decompose the one or more filter expressions and the one or more custom fields into one or more decomposed values; and apply one-hot encoding to the title, the description, and the one or more decomposed values.

4. The system of claim 1, wherein the input corresponding to the new digital record includes one or more features associated with the new digital record, and wherein the one or more processors further:

compare the one or more features to labels for the plurality of clusters;

identify one or more clusters having a label that corresponds to the one or more features; and select the at least one cluster from the one or more clusters based on a similarity between the one or more features of the new digital record and features common to the digital records in the at least one cluster.

5. The system of claim 1, wherein the input corresponding to the new digital record is received from a client device, and wherein the one or more processors further:

transmit, via a network, the one or more suggested features for inclusion in the new digital record to be displayed on the client device.

6. The system of claim 1, wherein each label of the plurality of clusters comprises an intent associated with a respective cluster, and the one or more processors are further to:

identify clusters having an intent that matches the one or more features of the new digital record; and rank the clusters based on a degree of match with the one or more features.

7. The system of claim 1, wherein determining the one or more features common to the digital records in the respective cluster comprises:

analyzing fields associated with the digital records included in the at least one cluster; and identifying at least one field occurring in multiple digital records of the at least one cluster.

8. The system of claim 1, wherein to generate the one or more suggested features, the one or more processors are further to:

identify at least one feature included in the digital records in the at least one cluster that is not included in the new digital record; and select the one or more suggested features from among the at least one feature.

9. The system of claim 1, wherein to identify the at least one cluster from the plurality of clusters, the one or more processors further:

identify at least two clusters having labels that correspond to the one or more features of the new digital record;

determine a similarity score between the new digital record and digital records in each of the at least two clusters; and select the at least one cluster having the digital records with a highest similarity score.

10. A method, comprising:

encoding, by one or more processors, coupled with memory, a plurality of features selected from a plurality of digital records to form a plurality of binary vectors, wherein each of the plurality of binary vectors is associated with a respective digital record of the plurality of digital records;

constructing, by the one or more processors, a first matrix using the plurality of binary vectors, wherein each row of the first matrix represents a digital record and each column of the first matrix represents at least one of the plurality of features;

applying, by the one or more processors, a vector-based function to the first matrix to compute a metric indicative of an association between each pair of binary vectors;

constructing, by the one or more processors, a second matrix based on application of the vector-based function, wherein each entry of the second matrix comprises a respective metric associated with a corresponding pair of binary vectors;

computing, by the one or more processors, for each binary vector, a corresponding average metric based on entries in the second matrix that include each binary vector;

determining, by the one or more processors, that the metric associated with a respective entry in the second matrix exceeds the corresponding average metric for one or both of the binary vectors associated with the respective entry;

grouping, by the one or more processors, responsive to the determination that the metric exceeds the corresponding average metric, the plurality of digital records into a plurality of clusters;

determining, by the one or more processors, a label for each cluster of the plurality of clusters based on one or more features common to digital records in a respective cluster;

responsive to receiving input corresponding to a new digital record, identifying, by the one or more processors, a cluster from the plurality of clusters having a label that corresponds to one or more features of the new digital record;

generating, by the one or more processors, one or more suggested features for the new digital record based on the at least one cluster; and transmitting, by the one or more processors, to a computing device, data to cause the computing device to present, via an output device coupled with the computing device, the one or more suggested features for the new digital record.

11. The method of claim 10, wherein the vector-based function comprises a cosine similarity function, wherein the metric indicative of the association between each pair of binary vectors comprises a cosine similarity value, and wherein computing each corresponding average metric comprises:

accessing, by the one or more processors, entries of the second matrix that correspond to pairs that include each binary vector;

computing, by the one or more processors, an average cosine similarity value for each binary vector based on the cosine similarity value of each accessed entry; and storing, by the one or more processors, the average cosine similarity value as the corresponding average metric for each binary vector.

12. The method of claim 10, wherein encoding the plurality of features comprises:

extracting, by the one or more processors, for each digital record of the plurality of digital records, a title, a description, one or more filter expressions, and one or more custom fields;

decomposing, by the one or more processors, the one or more filter expressions and the one or more custom fields into one or more decomposed values; and applying, by the one or more processors, one-hot encoding to the title, the description, and the one or more decomposed values.

13. The method of claim 10, wherein the input corresponding to the new digital record includes one or more features associated with the new digital record, and wherein the method further comprises:

comparing, by the one or more processors, the one or more features to labels for the plurality of clusters;

identifying, by the one or more processors, one or more clusters having a label that corresponds to the one or more features; and selecting, by the one or more processors, the at least one cluster from the one or more clusters based on a similarity between the one or more features of the new digital record and features common to the digital records in the at least one cluster.

14. The method of claim 10, wherein the input corresponding to the new digital record is received from a client device, and wherein the method further comprises:

transmitting, by the one or more processors, via a network, the one or more suggested features for inclusion in the new digital record to be displayed on the client device.

15. The method of claim 10, wherein each label of the plurality of clusters comprises an intent associated with a respective cluster, and the method further comprising:

identify at least two clusters having an intent that matches the one or more features of the new digital record; and rank the at least two clusters based on a degree of match with the one or more features.

16. The method of claim 10, wherein determining the one or more features common to the digital records in a respective cluster comprises:

analyzing fields associated with the digital records included in the at least one cluster; and identifying at least one field occurring in multiple digital records of the at least one cluster.

17. The method of claim 10, wherein generating the one or more suggested features comprises:

identifying, by the one or more processors, at least one feature included in digital records in the at least one cluster that are not included in the new digital record; and selecting, by the one or more processors, the one or more suggested features from among the at least one feature.

18. The method of claim 10, wherein identifying the at least one cluster from the plurality of clusters comprises:

identifying, by the one or more processors, at least two clusters having labels that correspond to the one or more features of the new digital record;

determining, by the one or more processors, a similarity score between the new digital record and digital records in each of the at least two clusters; and selecting, by the one or more processors, the at least one cluster having the digital records with a highest similarity score.

19. A non-transitory computer-readable storage medium (CRM) having one or more instructions stored thereon, the one or more instructions executable by one or more processors to:

encode a plurality of features selected from a plurality of digital records to form a plurality of binary vectors, wherein each of the plurality of binary vectors is associated with a respective digital record of the plurality of digital records;

construct a first matrix using the plurality of binary vectors, wherein each row of the first matrix represents a digital record and each column of the first matrix represents at least one of the plurality of features;

apply a vector-based function to the first matrix to compute a metric indicative of an association between each pair of binary vectors;

construct a second matrix based on application of the vector-based function, wherein each entry of the second matrix comprises a respective metric associated with a corresponding pair of binary vectors;

compute, for each binary vector, a corresponding average metric based on entries in the second matrix that include each binary vector;

determine that the metric associated with a respective entry in the second matrix exceeds the corresponding average metric for one or both of the binary vectors associated with the respective entry;

group, responsive to the determination that the metric exceeds the corresponding average metric, the plurality of digital records into a plurality of clusters;

determine a label for each cluster of the plurality of clusters based on one or more features common to digital records in a respective cluster;

responsive to receiving input corresponding to a new digital record, identify at least one cluster from the plurality of clusters having a label that corresponds to one or more features of the new digital record;

generate one or more suggested features for the new digital record based on the at least one cluster; and transmit, to a computing device, data to cause the computing device to present, on an output device coupled with the computing device, the one or more suggested features for the new digital record.

20. The non-transitory CRM of claim 19, wherein the vector-based function comprises a cosine similarity function, wherein the metric indicative of the association between each pair of binary vectors comprises a cosine similarity value, and wherein to compute each corresponding average metric, the one or more instructions are further executable by the one or more processors to:

access entries of the second matrix that correspond to pairs that include each binary vector;

compute an average cosine similarity value for each binary vector based on the cosine similarity value of each accessed entry; and store the average cosine similarity value as the corresponding average metric for each binary vector.

* * * * *